United States Patent
Li et al.

(10) Patent No.: US 9,463,544 B2
(45) Date of Patent: Oct. 11, 2016

(54) AUTO TOOLS CHANGE WITH SPACE ALLOWANCE FOR TOOL REJECTION OF SPINDLE

(71) Applicant: POJU PRECISION MACHINERY CO., LTD., Taichung (TW)

(72) Inventors: Shuang-Shu Li, Taichung (TW); Shuang-Yu Li, Taichung (TW)

(73) Assignee: POJU PRECISION MACHINERY CO., LTD., Taichung (TW)

( * ) Notice: Subject to any disclaimer, the term of this patent is extended or adjusted under 35 U.S.C. 154(b) by 340 days.

(21) Appl. No.: 14/317,580

(22) Filed: Jun. 27, 2014

(65) Prior Publication Data
US 2015/0018180 A1 Jan. 15, 2015

(30) Foreign Application Priority Data
Jul. 3, 2013 (TW) .............................. 102123904 A

(51) Int. Cl.
*B23Q 3/157* (2006.01)
*B23Q 3/155* (2006.01)
*B23Q 5/34* (2006.01)

(52) U.S. Cl.
CPC ......... *B23Q 3/15713* (2013.01); *B23Q 3/1554* (2013.01); *B23Q 3/15573* (2013.01); *B23Q 5/347* (2013.01); *Y10T 483/1755* (2015.01); *Y10T 483/1767* (2015.01)

(58) Field of Classification Search
CPC ............ B23Q 3/1554; B23Q 3/15573; B23Q 3/15713; Y10T 483/1748; Y10T 483/1752; Y10T 483/1755; Y10T 483/1757; Y10T 483/176; Y10T 483/1767; Y10T 483/1769; Y10T 483/1771; Y10T 483/1779; Y10T 483/1783
USPC ........ 483/36, 38, 39, 40, 41, 44, 45, 46, 49, 483/51
See application file for complete search history.

(56) References Cited

U.S. PATENT DOCUMENTS

| | | | | |
|---|---|---|---|---|
| 4,833,772 A | * | 5/1989 | Kobayashi | B23Q 3/15526 483/44 |
| 5,081,762 A | * | 1/1992 | Kin | B23Q 3/1554 483/44 |
| 5,337,623 A | * | 8/1994 | Huang | B23Q 3/1554 74/53 |
| 5,820,536 A | * | 10/1998 | Sato | B23Q 3/1554 483/30 |
| 5,928,120 A | * | 7/1999 | Kameyama | B23Q 3/15713 483/1 |
| 5,938,578 A | * | 8/1999 | Baba | B23Q 3/15713 483/38 |

(Continued)

FOREIGN PATENT DOCUMENTS

JP EP 1310705 A1 * 5/2003 ........... B23Q 3/1554

*Primary Examiner* — Sunil K Singh
*Assistant Examiner* — Michael Vitale
(74) *Attorney, Agent, or Firm* — WPAT, P.C., Intellectual Property Attorneys; Anthony King

(57) ABSTRACT

An auto tools change with space allowance for tool rejection of spindle includes an arm seat, an arm shaft, a tools change arm, a flat cam, and a driving arm, while the flat cam has a driving groove for driving the driving arm to swing and thus facilitates the tool clamping and tool unclamping. Therein, the driving arm has a tool clamping section having an allowance groove, a first transition section, a tool unclamping section, and a second transition section. Therefore, a larger width of the allowance groove is provided on the driving groove, thereby offering a sliding space for the tools change arm. Thus, a space allowance is produced during tool pushing process, thereby not only preventing the main shaft and the tool from being damaged, but also preventing the tools change arm from deformation.

9 Claims, 7 Drawing Sheets

(56) References Cited

U.S. PATENT DOCUMENTS

| | | | |
|---|---|---|---|
| 5,943,860 A * | 8/1999 | Kato | F04B 9/047 60/325 |
| 6,716,146 B2 * | 4/2004 | Kato | B23Q 1/5468 483/32 |
| 6,786,856 B2 * | 9/2004 | Kato | B23Q 3/1554 483/3 |
| 7,748,302 B2 * | 7/2010 | Kato | B23Q 5/341 82/117 |
| 2002/0043123 A1 * | 4/2002 | Kato | B23Q 3/1554 74/431 |
| 2003/0114282 A1 * | 6/2003 | Kato | B23Q 3/1554 483/39 |
| 2011/0201484 A1 * | 8/2011 | Isozumi | B23Q 3/12 483/36 |

* cited by examiner

AUTO TOOLS CHANGE WITH SPACE ALLOWANCE FOR TOOL REJECTION OF SPINDLE

BACKGROUND OF THE INVENTION

1. Field of the Invention

The present invention relates to auto tools changes, and more particularly, to an auto tools change with space allowance during the tool pushing process of the spindle. The present invention is able to accurately clamp the tool and prevent the spindle from being damaged during the overtravel of tool ramming.

2. Description of the Related Art

Known CNC tool machines are usually provided with a tool magazine and an auto tools change for automatically changing a tool stored in the tool magazine with a tool on the spindle of the tool machine through a tools change arm, thereby meeting different demand of processing, achieving the effect of process automation and acceleration.

However, regarding an ordinary tool machine, a tool is tightly drawn and fastened in a taper bore of the tool machine through a tool drawing rod and a claw, wherein temperature of the tool rises due to the rotation or the cutting action of the spindle during operation. As a result, the tool seat of the tool is overly stuck in the taper bore. When the tools change arm tends to withdraw the tool, the force simply produced by the tool drawing rod of the spindle pushing through the claw is not enough, so an additional process of ramming the tool seat for separating the tool seat and the taper bore is needed, whereby the tools change arm is able to withdraw the tool.

Furthermore, for enabling the tools change arm to accurately clamp the tool, the tools change arm is needed to be maintained at a correct height for rotating to clamp the tool, wherein the allowance of movement thereof is considerably limited. As a result, when the tool drawing rod rams the tool seat, due to the fixed height of the tools change arm for clamping the tool, the tools change arm has to bear the ramming force, causing the tools change arm to be deformed. Also, because the ramming force focuses on the junction of the tool drawing rod and the tool seat, damage of the tool drawing rod and the tool seat occurs possibly.

SUMMARY OF THE INVENTION

For improving the disadvantages and inconvenience aforementioned, the present invention discloses an auto tools change with space allowance for tool rejection of spindle. Therein, a driving groove of the flat cam is further concavely provided with an allowance groove. Due to a larger width of the allowance groove on the driving groove, an axial sliding space is provided to the tools change arm as a space allowance for the spindle to move during tool rejection. As a result, in the process of tool pushing of the spindle, the tools change arm has an allowance for vertical movement, whereby the damage caused by the spindle ramming the tool and the deformation of tools change arm are prevented.

The present invention provides an auto tools change with space allowance for tool rejection of spindle, comprising:

an arm seat, with an arm shaft installed inside and thereby capable of rotating and axially sliding therein, while one end of the arm shaft exposes outward from the arm seat for being installed with a tools change arm;

a flat cam, axially and rotatably disposed in the arm seat by a rotation axle, and concavely provided with a driving groove thereon, while the driving groove is formed by a tool clamping section, a first transition section, a tool unclamping section, and a second transition section that are orderly provided; and a driving arm, with one end thereof as a swinging end axially disposed in the arm seat and the other end thereof as a driving end, and a rolling member capable of moving in the driving groove disposed between the swinging end and the driving end, while the driving end is connected to the arm shaft for enabling the driving arm to make the arm shaft axially slide along the shape variation of the driving groove during the rotation of the flat cam.

Therein, the tool clamping section of the driving groove is provided with an allowance groove, whereby a larger width is offered to the allowance groove of the driving groove. Therefore, an axial sliding space is produced for the tools change arm as a space allowance for the spindle to move during tool rejection.

The main objective of the present invention is that the allowance groove of the driving groove has a larger width, whereby a sliding space is able to be produced for the tools change arm to move. During the tool pushing process of the spindle, the space allowance of the tools change arm is automatically produced, thereby preventing not only the spindle and the tool from being damaged due to the ramming, but also the deformation of the tools change arm from happening.

Another objective of the present invention is that radial widths of the tool clamping section, the first transition section, the tool unclamping section, and the second transition section remain approximately equal to the size of the rolling member. Therefore, when the rolling member slidingly moves in the tool clamping section, the tools change arm is allowed to be precisely maintained at the same height, whereby the tools change arm accurately clamps the tool when rotates to exchange the tools.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
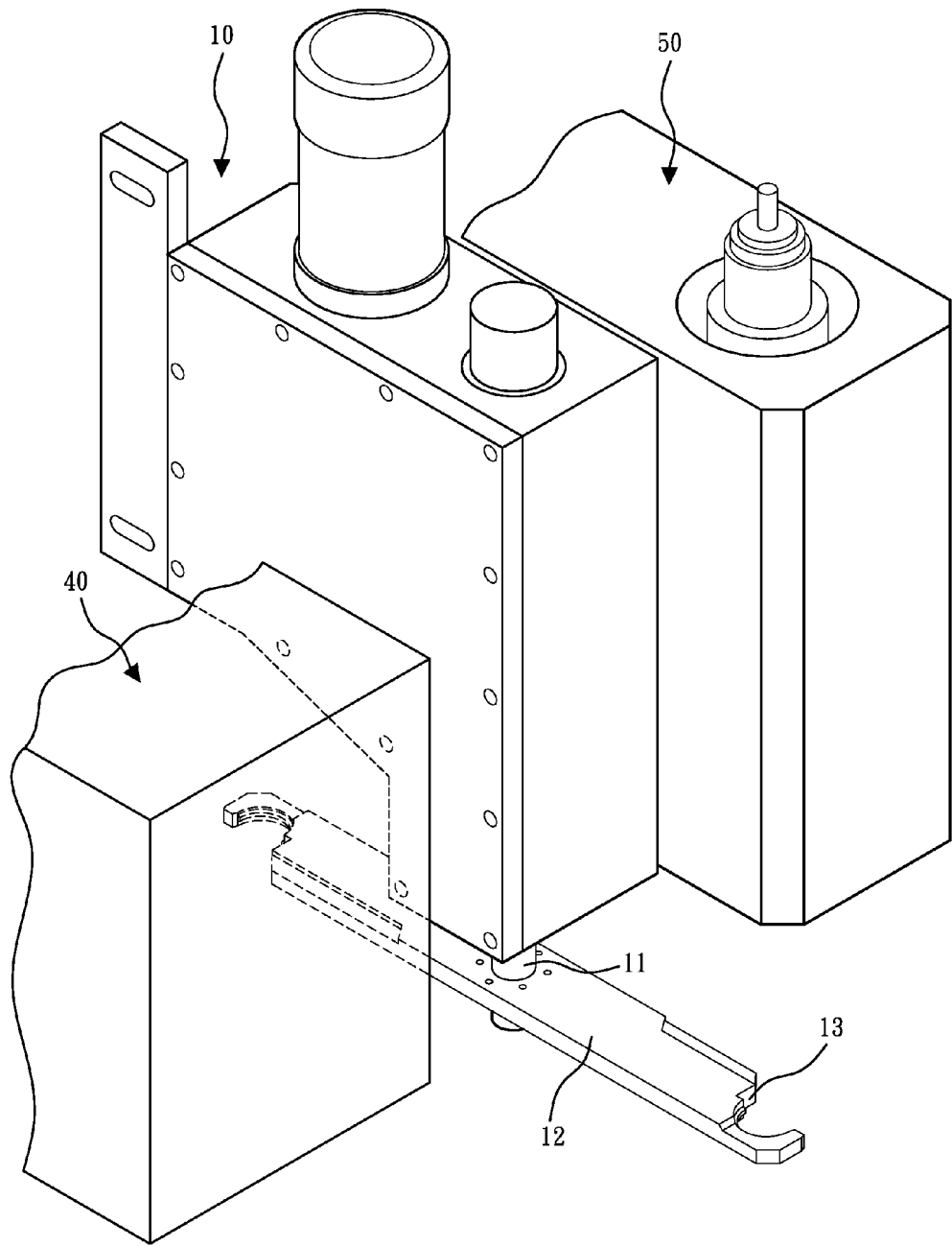
FIG. 1 is a perspective view of the auto tools change in accordance with the present invention.
Figure 2:
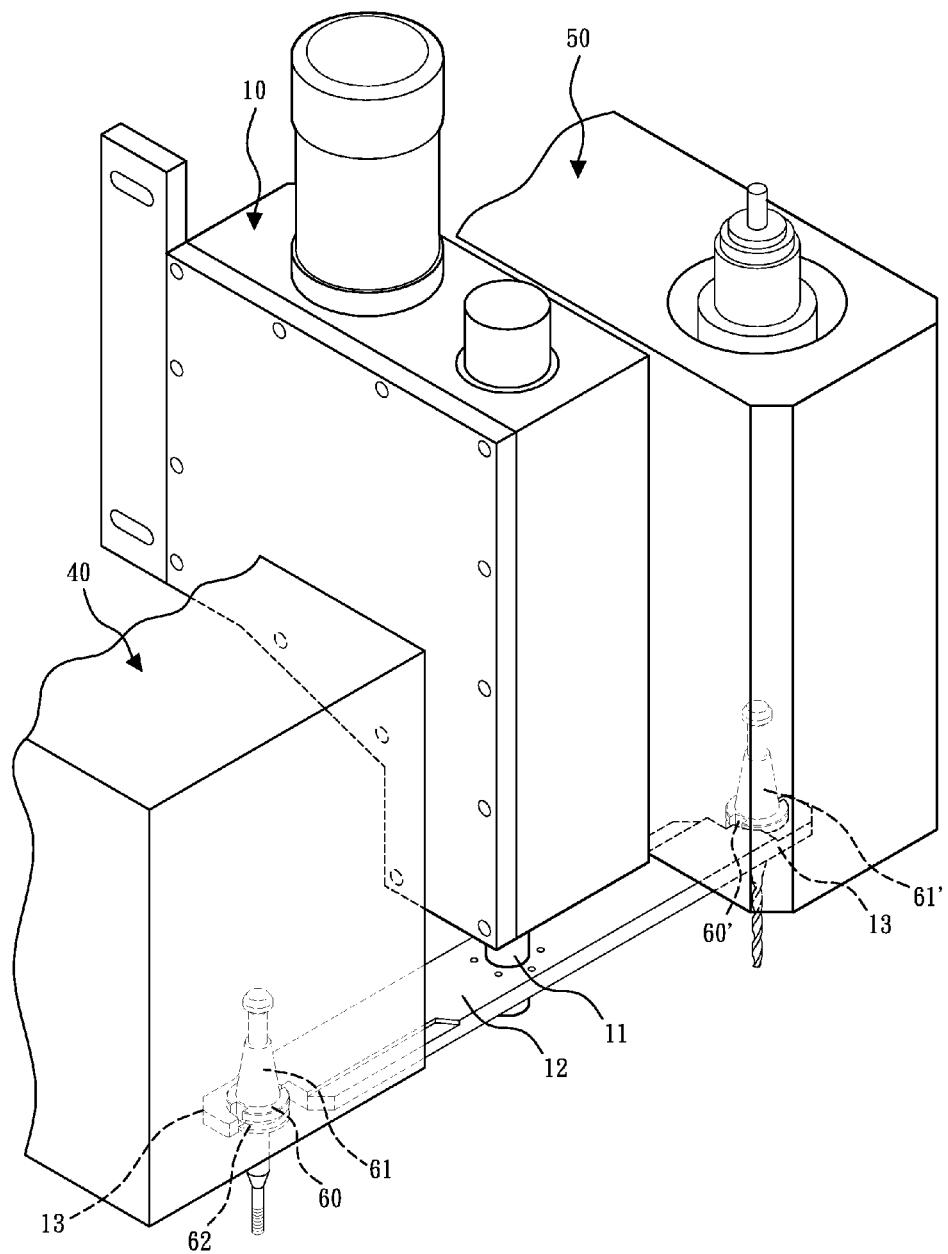
FIG. 2 is another perspective view of the auto tools change in accordance with the present invention.
Figure 3:
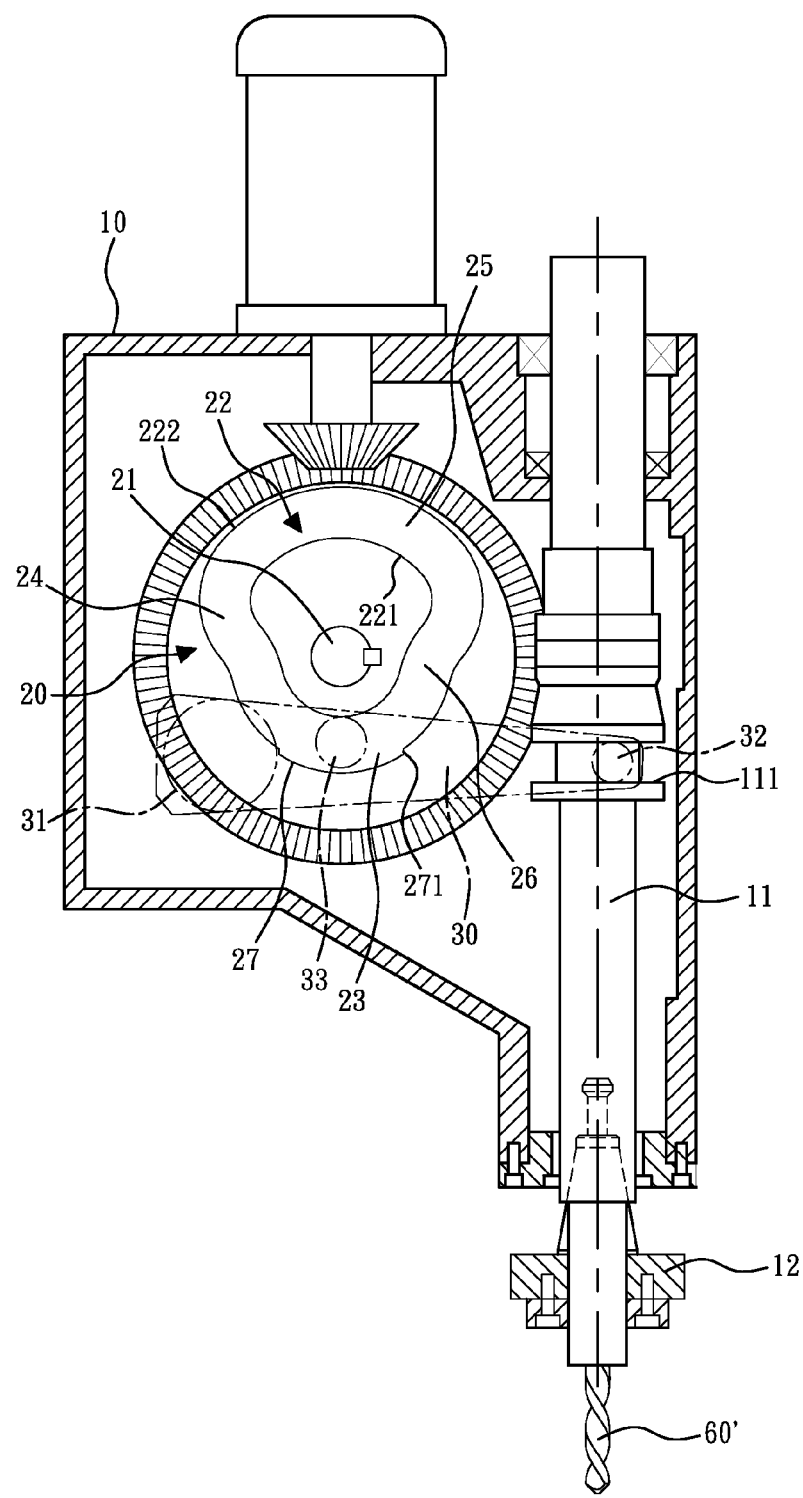
FIG. 3 is a sectional view of the auto tools change in accordance with the present invention.

Referring to FIG. 1 to FIG. 3, the auto tools change with space allowance for tool rejection of spindle of the present invention comprises an arm seat 10, a flat cam 20, and a driving arm 30.

The arm seat 10 is provided with an arm shaft 11 therein, whereby the arm shaft 11 is allowed to rotate and axially slide in the arm seat 10, while one end of the arm shaft 11 exposes outward from the arm seat 10 for being installed with a tools change arm 12. Therein, two ends of the tools change arm 12 are provided with a tool holder 13, respectively. Furthermore, the arm shaft 11 is allowed to be directly or indirectly connected to a power source, whereby the rotational movement of the arm shaft 11 is facilitated.

The flat cam 20 is axially and rotatably disposed in the arm seat 10 by a rotation axle 21, and a driving groove 22 is concavely disposed on the flat cam 20, while the driving groove 22 is formed by a tool clamping section 23, a first transition section 24, a tool unclamping section 25, and a second transition section 26 that are orderly provided. Also, an allowance groove 27 is provided on the tool clamping section 23 of the driving groove 22. Therein, the driving groove 22 is further provided with an inner wall 221 and an outer wall 222, and the allowance groove 27 is disposed on the outer wall 222 of the tool clamping section 23. Furthermore, two ends of the allowance groove 27 are provided with a bevel 271, respectively. In addition, the allowance groove 27 is disposed at the center of the tool clamping section 23, and the length of the allowance groove 27 accounts for four fifths of the total length of the tool clamping section 23.

The driving arm 30 has one end thereof as a swinging end 31 axially disposed in the arm seat 10 and the other end thereof as a driving end 32, while a rolling member 33 capable of moving in the driving groove 22 is disposed between the swinging end 31 and the driving end 32, and the driving end 32 is connected with the arm shaft 11. Therein, a ring groove 111 is disposed on the arm shaft 11 for slidingly receiving the driving end 32 of the driving arm 30. With such structure, when the flat cam 20 rotates, the rolling member 33 is allowed to move along the shape variation of the driving groove 22, thus making the driving arm 30 swing upward and downward with the swinging end 31 as the swinging axle, thereby triggering the arm shaft 11 to be driven by the driving end 32 to axially slide.

Therein, the tool clamping section 23 and the tool unclamping section 25 are both an arc-shaped section. The radial distance from the tool clamping section 23 to the rotation axle 21 is smaller than the radial distance from the tool unclamping section 25 to the rotation axle 21. The radial distance from every point on the first and second transition sections 24, 26 to the rotation axle 21 is larger than the radial distance from the tool clamping section 23 to the rotation axle 21 and at the same time smaller than the radial distance from the tool unclamping section 25 to the rotation axle 21. Therein, the radial widths of the tool clamping section 23, the first transition section 24, the tool unclamping section 25, and the second transition section 26 are equal to the width of the rolling member 33.

Figure 6:
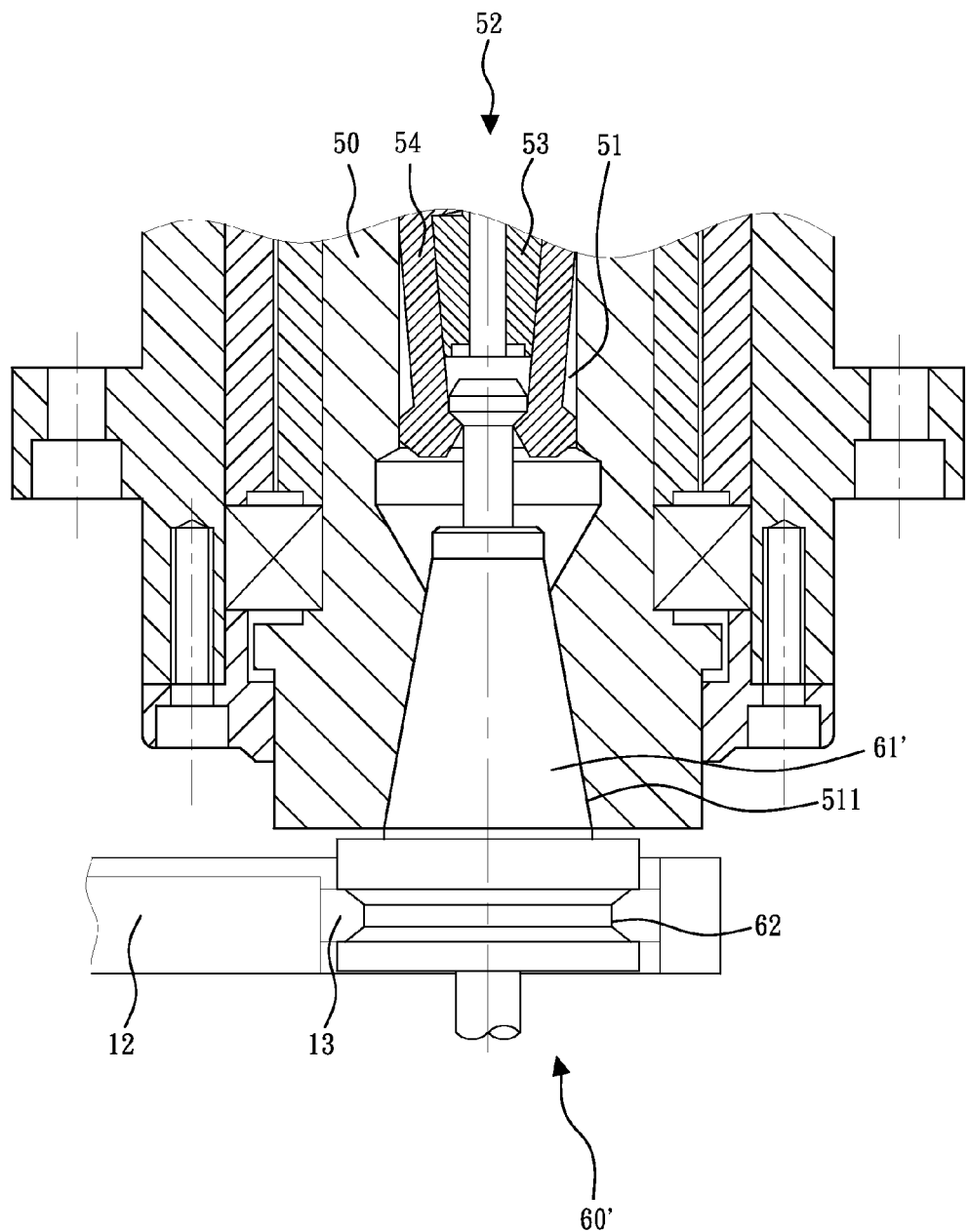
FIG. 6 is a schematic view illustrating the operation of the tools change arm clamping the tool in accordance with the present invention.

Referring to FIG. 1 and FIG. 2, the auto tools change of the present invention is provided between at least a tool magazine 40 and a main shaft 50 of the tool machine, wherein plural tools 60 having a tool seat 61 are stored in the tool magazine 40, and each tool seat 61 has a clamp groove 62 for being clamped by the tool holder 13. As shown in FIG. 6, the main shaft 50 of the tool machine has a tool drawing rod 52 disposed in a spindle bore 51, while the end part of the tool drawing rod 52 is allowed to draw and fasten a tool seat 61' of a tool 60' by use of a claw seat 53 and a claw 54 or other known fastening device, thereby positioning the tool 60' in a taper bore 511 at the end part of the spindle bore 51. Therefore, the main shaft 50 of the tool machine is capable of driving the tool 60' to rotate for processing, such as cutting or drilling.

With the foregoing configuration, operation of the present invention will be illustrated below.

Figure 4:
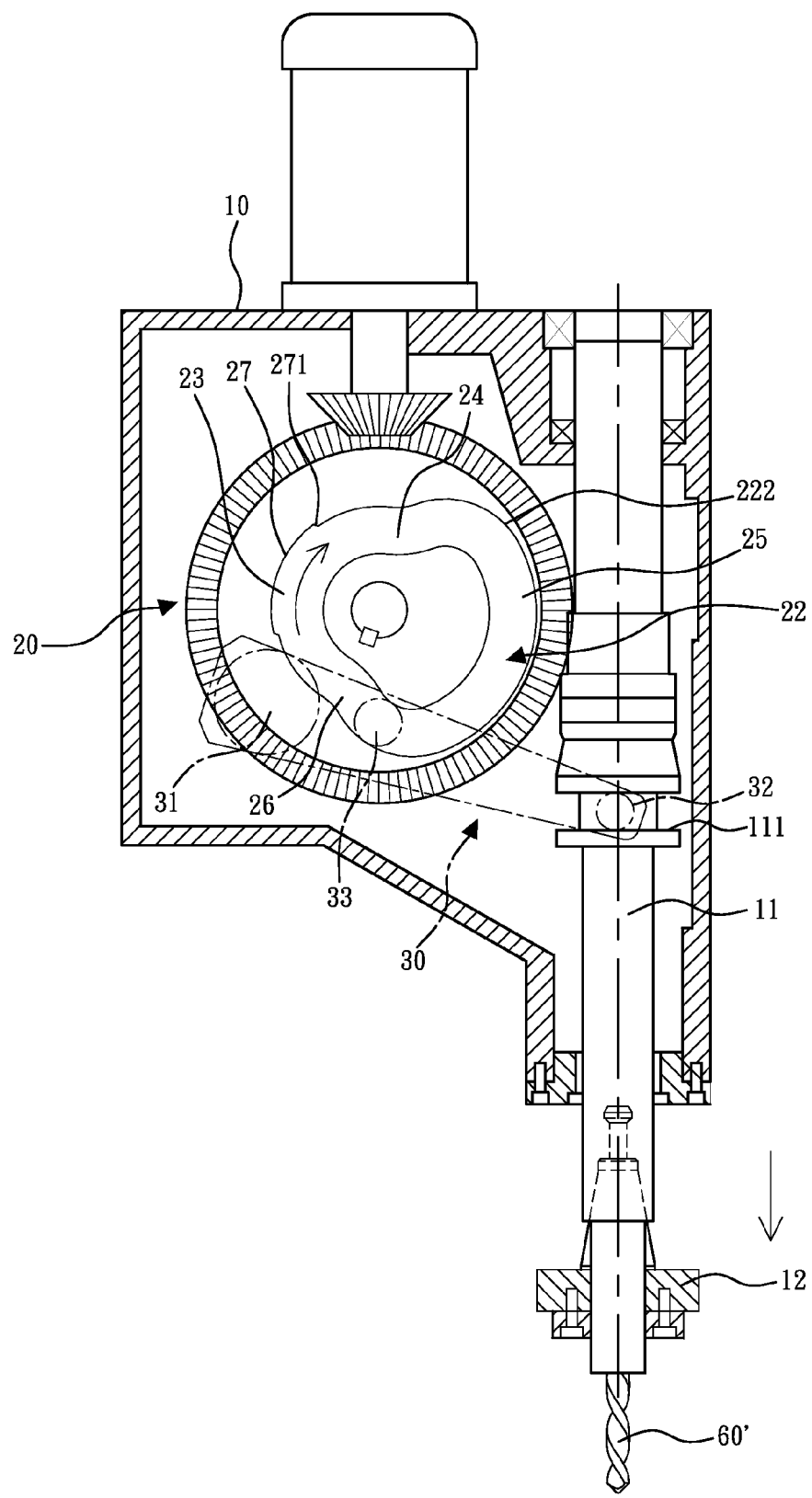
FIG. 4 is a schematic sectional view illustrating the operation of the auto tools change in accordance with the present invention.
Figure 5:
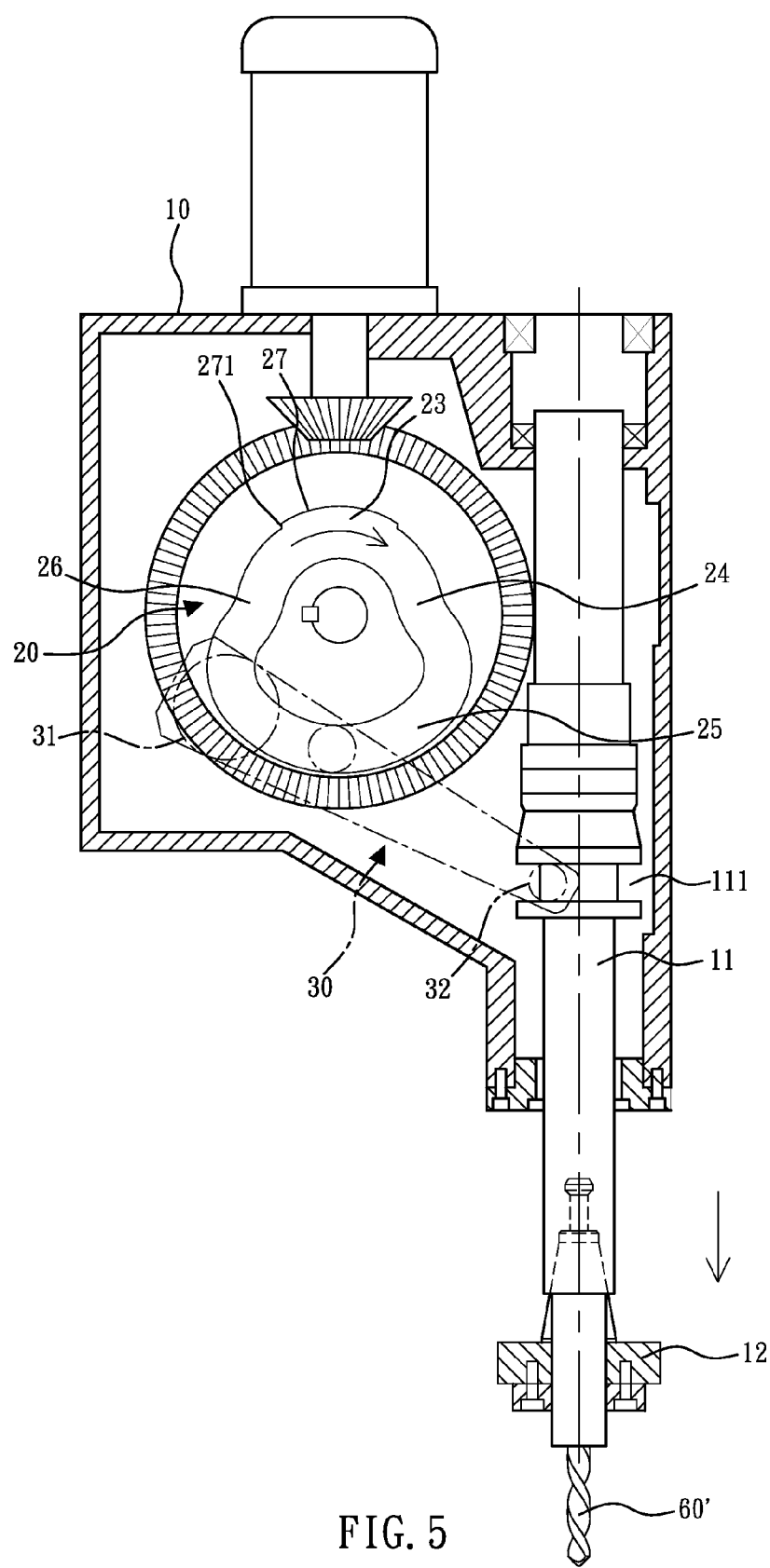
FIG. 5 is another schematic sectional view illustrating the operation of the auto tools change in accordance with the present invention.

Referring to FIG. 3 to FIG. 5, when the flat cam 20 rotates, the rolling member 33, along the shape variation of the driving groove 22, triggers the driving arm 30 to swing upward and downward with the swinging end 31 as the swinging axle, thereby driving the driving end 32 to act in the ring groove 111 for triggering the arm shaft 11 to axially slide. Therein, the radial distance from the tool clamping section 23 to the rotation axle 21 is smaller than the radial distance from the tool unclamping section 25 to the rotation axle 21. Also, the radial distance from every point on the first and second transition sections 24, 26 to the rotation axle 21 is larger than the radial distance from the tool clamping section 23 to the rotation axle 21 and at the same time smaller than the radial distance from the tool unclamping section 25 to the rotation axle 21. Thus, when the rolling member 33 is at the tool clamping section 23, the tools change arm 12 moves to a first height; when the rolling member 33 is at the tool unclamping section 25, the tools change arm 12 moves to a second height, wherein the first height is higher than the second height. Furthermore, if the rolling member 33 moves to the first transition section 24 or the second transition section 26, the tools change arm 12 correspondingly moves between the first height and the second height.

Cooperating with the rotation of the arm shaft 11, the tools change arm 12 is allowed to rotate from a stand-by position (as shown in FIG. 1) at the first height. At the meantime, the rolling member 33 is positioned at the tool clamping section 23, whereby the two tool holders 13 on the two ends of the tools change arm 12 clamp the tool 60 in the tool magazine 40 and the tool 60' in the main shaft 50 of the tool machine, respectively. Next, with the rotation of the flat cam 20, the rolling member 33 moves from the first transition section 24 to the tool unclamping section 25, whereby the tools change arm 12 descends from the first height to the second height, causing the tools 60, 60' to be released from the tool magazine 40 and the main shaft 50 of the tool machine, respectively, thus completing the action of tools rejection.

Next, the rotation of the arm shaft 11 makes the positions of the tool 60 in the tool magazine 40 and the tool 60' in the main shaft 50 of the tool machine exchanged, followed by the rolling member 33 moving from the second transition section 26 to the tool clamping section 23, whereby the tools 60, 60' enter and are positioned in the main shaft 50 of the tool machine and the tool magazine 40, respectively. After the tool holder 13 unclamps the tools 60, 60', the tools change arm 12 reversely rotates back to the stand-by position, thus completing the auto tools changing process.

Figure 7:
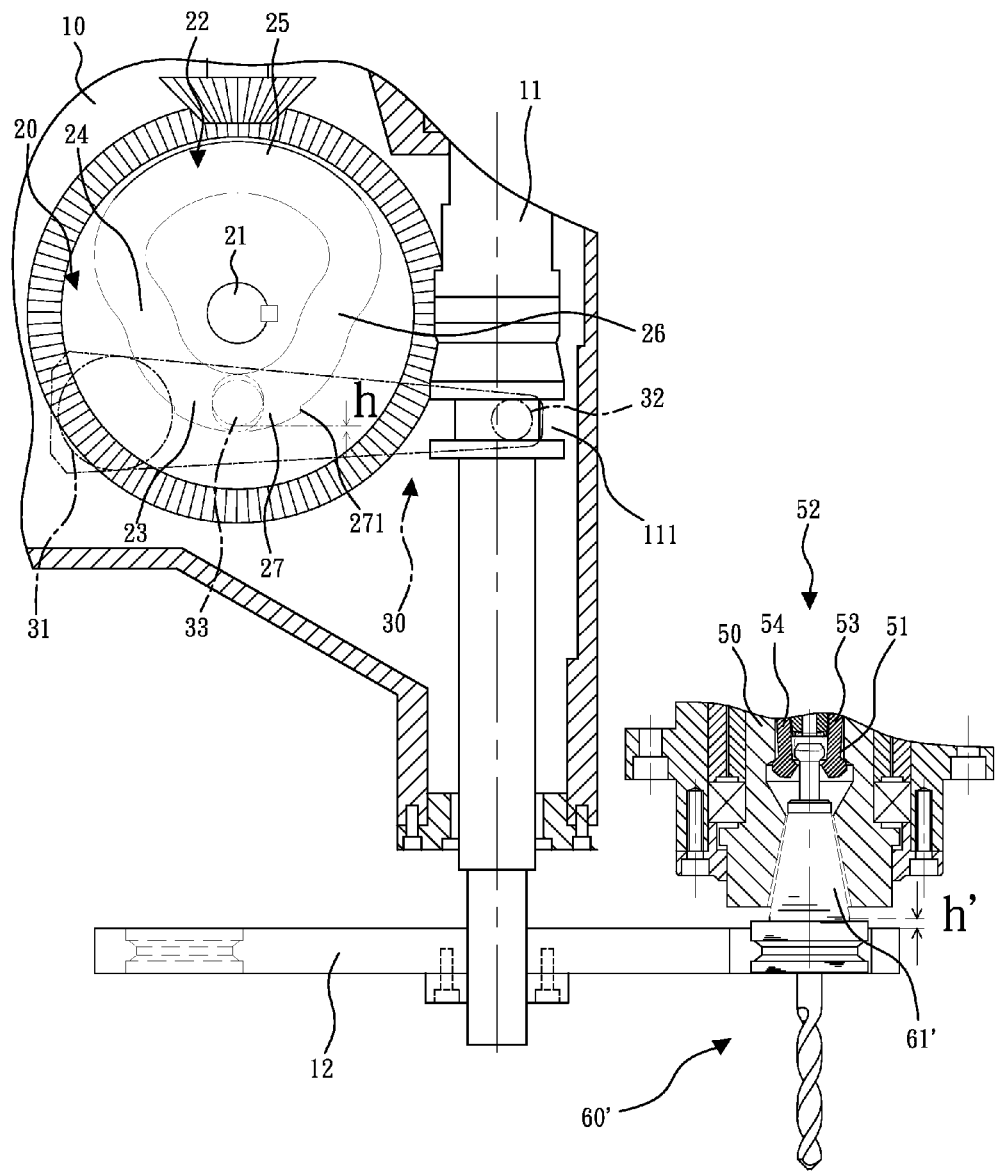
FIG. 7 is a schematic view illustrating the tool pushing process as an overtravel of the spindle in accordance with the present invention.

As shown in FIG. 2, FIG. 6 and FIG. 7, when the tool 60' in the main shaft 50 of the tool machine is to be rejected, the tool drawing rod 52 moves to a releasing position to release the claw 54. Also, for facilitating the rejection of the tool seat 61' from the taper bore 511, the tool drawing rod 52 is additionally provided with a movement process h', wherein the claw seat 53 rams the tool seat 61 to separate the tool seat 61 from the taper bore 511 (as shown in FIG. 7).

Meanwhile, as shown in FIG. 7, the allowance groove 27 provides a larger width on the driving groove 22, when the tool drawing rod 52 rams the tool seat 61, the rolling member 33 is allowed to undergo the movement process h' toward the allowance groove 27 on one lateral side, whereby an axial sliding space is provided to the arm shaft 11, enabling the tools change arm 12 to acquire a space allowance. As a result, the damage due to the tool drawing rod 52 ramming the tool 61' and the deformation of the tools change arm 12 caused by bearing ramming force are prevented.

In addition, radial widths of the tool clamping section 23, the first transition section 24, the tool unclamping section 25, and the second transition section 26 remain approximately equal to the size of the rolling member 33. When the rolling member 33 slides in the driving groove 22, the tools change arm 12 thereby precisely remains at the correct height. With the allowance groove 27 disposed at the center of the tool clamping section 23, and the length of the allowance groove 27 accounting for four fifths of the total length of the tool clamping section 23, when the tools change arm 12 rotates to clamp the tools 60, the rolling member 33 is positioned at the initial part of the tool clamping section 23 having a radial width identical with the size of the rolling member 33, whereby the tools change arm 12 precisely remains at the correct height and is capable of accurately clamping the clamp groove 62 of the tool 60. After the rolling member 33 entering the allowance groove 27, the main shaft 50 of the tool machine starts to release and ram the tool 60, wherein the tools change arm 12 is provided with a space allowance.

Therefore, the present invention is provided with a space allowance for not only preventing the tool drawing rod 52 and the tool 61' from being damaged due to the ramming, but also preventing the tools change arm 12 from being deformed. Also, the accuracy of the tools change arm 12 for clamping the tools is maintained, thus assuring the normal tools changing ability and accuracy.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An auto tools changer with a space allowance for enabling a draw rod of a spindle to move during tool ejection, comprising:
    an arm seat, with an arm shaft installed therein that is capable of rotating about an axis and axially sliding along said axis, wherein one end of the arm shaft extends outward from the arm seat and is connected to a tool change arm;
    a flat cam that is disposed in the arm seat and is rotatably driven by a rotation axle, wherein the flat cam has a concave driving groove formed thereon, and the driving groove is provided with an inner wall and an outer wall between which a tool clamping section, a first transition section, a tool unclamping section, and a second transition section extend; and
    a driving arm having a swinging end, a driving end, and a projecting rolling member disposed there between, the rolling member is connected to the driving groove and is capable of moving within the driving groove, and the driving end is connected to the arm shaft thereby enabling the driving arm to axially slide the arm shaft along said axis via the driving groove during rotation of the flat cam,
    wherein an allowance groove is disposed on the outer wall in the tool clamping section of the driving groove, whereby the rolling member cannot simultaneously contact the inner wall and the outer wall of the driving groove when disposed within the allowance groove, as a larger width is offered between the inner wall and outer wall within the confines of the allowance groove as compared to a width offered between the inner wall and outer wall within the remainder of the driving groove, and an axial sliding space is thus produced for the rolling member as the space allowance for the draw rod of the spindle to move during tool ejection.

2. The auto tool changer of claim 1, wherein the allowance groove is disposed at the center of the tool clamping section, and the length of the allowance groove accounts for four fifths of the length of the tool clamping section.

3. The auto tool changer of claim 1, wherein the allowance groove has a first end and second end, and each end is provided with a respective bevel.

4. The auto tool changer of claim 1, wherein the tool clamping section and the tool unclamping section are each arc-shaped.

5. The auto tool changer of claim 4, wherein a radial distance from the tool clamping section to a rotation axle axis of rotation is smaller than a radial distance from the tool unclamping section to the rotation axle axis of rotation.

6. The auto tool changer of claim 4, wherein a radial distance from every point on the first transition section and the second transition section to a rotation axle axis of rotation is larger than a radial distance from the tool clamping section to the rotation axle axis of rotation, but smaller than a radial distance from the tool unclamping section to the rotation axle axis of rotation.

7. The auto tool changer of claim 1, wherein the width offered between the inner wall and outer wall within the remainder of the driving groove is identical to the diameter of the rolling member.

8. The auto tool changer of claim 1, wherein a ring groove is disposed on the arm shaft for slidingly receiving the driving end of the driving arm.

9. The auto tool changer of claim 1, wherein the tool change arm has a first end and second end, and each end is provided with a respective tool holder.

* * * * *